US012644305B1

(12) United States Patent
Kang et al.

(10) Patent No.: US 12,644,305 B1
(45) Date of Patent: Jun. 2, 2026

(54) SAFETY DOOR HANDLE FOR TODDLERS

(71) Applicant: Jun Seo Kang, Seoul (KR)

(72) Inventors: Jun Seo Kang, Seoul (KR); Hyeon Seo Kang, Seoul (KR)

(73) Assignee: Jun Seo Kang, Seoul (KR)

( * ) Notice: Subject to any disclaimer, the term of this patent is extended or adjusted under 35 U.S.C. 154(b) by 0 days.

(21) Appl. No.: 19/325,575

(22) Filed: Sep. 11, 2025

(30) Foreign Application Priority Data

Aug. 12, 2025 (KR) ........................ 10-2025-0111590

(51) Int. Cl.
*E05B 1/00* (2006.01)

(52) U.S. Cl.
CPC .................................. *E05B 1/0053* (2013.01)

(58) Field of Classification Search
CPC ...... E05B 1/0053; E05B 1/003; E05B 53/001; E05B 2001/0076; G05G 1/10; E05C 1/16
See application file for complete search history.

(56) References Cited

U.S. PATENT DOCUMENTS 3,575,453 A * 4/1971 Hohl ..................... E05B 1/0053 16/DIG. 30
4,058,333 A * 11/1977 Roe ......................... E05B 63/06 292/DIG. 60
4,397,489 A * 8/1983 Lind ..................... E05B 1/0053 292/336.3
4,971,375 A * 11/1990 Grecco ................. E05B 1/0053 292/336.3
5,288,116 A * 2/1994 Donofrio .............. E05B 1/0053 16/DIG. 30
5,638,576 A * 6/1997 Mutone ................. E05B 1/0053 16/DIG. 30
5,664,287 A * 9/1997 Sendelbach ........... E05B 1/0053 292/347
5,881,433 A * 3/1999 Mutone ................. E05B 1/0053 16/DIG. 30
5,927,769 A * 7/1999 Pullen ................ E05B 17/2038 292/192
6,751,827 B1 * 6/2004 Fok ....................... E05B 1/0053 16/412
10,450,787 B1 * 10/2019 Jaffee ........................ E05F 5/04
12,258,781 B2 * 3/2025 Sauret ................... E05B 1/0053
2002/0088087 A1 * 7/2002 Keith ...................... F16D 1/101 16/413

(Continued)

FOREIGN PATENT DOCUMENTS

CN 214835890 U * 11/2021
CN 220319306 U * 1/2024

(Continued)

*Primary Examiner* — William L Miller
(74) *Attorney, Agent, or Firm* — Revolution IP, PLLC

(57) ABSTRACT

A safety door handle includes: a base part that has a base plate in which a lever hole into which a door handle is able to be fitted is formed and that is attached to one surface of a door; a fastening gear part that is coupled to a door handle shaft and has a gear provided on an outer circumferential surface; a central gear part that is gear-coupled to one side of the fastening gear part and has a diameter that is two times a diameter of the fastening gear part; and a main gear part that has the same diameter as the central gear part, is gear-coupled to one side of the central gear part, and has an auxiliary handle provided on one surface.

9 Claims, 7 Drawing Sheets

(56) References Cited

U.S. PATENT DOCUMENTS

| | | | | |
|---|---|---|---|---|
| 2008/0086842 | A1* | 4/2008 | Dayton | E05B 1/0053 16/412 |
| 2022/0178171 | A1* | 6/2022 | Zheng | E05B 15/0053 |
| 2023/0279698 | A1* | 9/2023 | Caines | E05B 1/0053 292/255 |
| 2026/0055634 | A1* | 2/2026 | Yantis | E05B 1/0053 |

FOREIGN PATENT DOCUMENTS

| | | | | | |
|---|---|---|---|---|---|
| CN | 220979099 | U | * | 5/2024 | |
| KR | 20-1985-0000495 | U | | 2/1985 | |
| KR | 20-1990-0005059 | U | | 3/1990 | |
| KR | 10-2287283 | B1 | | 8/2021 | |
| KR | 102883597 | B1 | * | 11/2025 | E05B 1/003 |

* cited by examiner

SAFETY DOOR HANDLE FOR TODDLERS

CROSS-REFERENCE TO RELATED APPLICATION

This application claims priority to and the benefit of Korean Patent Application No. 10-2025-0111590 filed on Aug. 12, 2025, the disclosure of which is incorporated herein by reference in its entirety.

BACKGROUND

1. Field of the Invention

The present invention relates to a safety door handle for toddlers, and more particularly, to a safety door handle for toddlers in which an auxiliary handle interlocks with a door handle through a gear at a position that can be reached by a hand of a toddler, thereby allowing the toddler to safely open the door.

2. Discussion of Related Art

Generally, a door handle is formed on an intermediate portion of a door to be suitable for adult height in order to be opened and closed by adults, and it may be difficult for children or toddlers, who are short and unable to reach the door handle by hand, to open the door.

Therefore, children and toddlers apply excessive force to the door handle or pound on the door in order to open the door, and this may be a direct cause of damage to the door.

Meanwhile, in order to address the above-described problems of the related art, "Auxiliary tool for door handle" has been proposed in Korean Utility Model Publication No. 20-1985-0000495. In an auxiliary tool for a door handle, an operating plate is attached to a rear surface of a rubber cap, and a tension string having a handle formed thereon is connected to one side of the operating plate. In this way, there is an inconvenience that, after pulling the handle downward and rotating the door handle, the tension string should be continuously pulled until the door is opened.

In addition, since the tension string is formed to be long, the tension string is stuck between the door and a door frame and cannot maintain its original function in some cases. Further, a problem in which the tension string breaks, or a coupling portion to which the tension spring is coupled is damaged may occur.

In addition, in "Ornamental auxiliary handle attached to door lock" that has been proposed in Korean Utility Model Publication No. 20-1990-0005059, an animal-shaped auxiliary handle is attached to a door handle portion using an adhesive tape, and a door is opened by rotating the door handle while holding the animal-shaped auxiliary handle. The animal-shaped auxiliary handle is attached at the same height as the door handle, and there is a problem that it is not suitable for children or toddlers who are short.

In addition, since the animal-shaped auxiliary handle is fixed using the adhesive tape, there are problems that the animal-shaped auxiliary handle may be detached when used for a long period of time, the adhesive tape may be pushed and cause the door handle portion to be sticky, and separation and coupling of the animal-shaped auxiliary handle from and to the door handle portion may not be easy.

RELATED ART DOCUMENTS

Patent Documents (Patent Document 0001) Korean Utility Model Publication No. 20-1985-0000495 (Date of Publication: Feb. 28, 1985)

(Patent Document 0002) Korean Utility Model Publication No. 20-1990-0005059 (Date of Publication: Mar. 8, 1990)

SUMMARY OF THE INVENTION

In order to address the above-described problems of the related art, the present invention is directed to providing a safety door handle for toddlers that has a new structure in which a central gear part and a main gear part having an auxiliary handle formed thereon are connected vertically to a fastening gear part coupled to a door handle shaft, and the main gear part, the central gear part, and the fastening gear part are rotated with a force pulling the auxiliary handle, thereby allowing a toddler to safely open the door.

The present invention is also directed to providing a safety door handle for toddlers in which a central gear part and a main gear part are each formed to have a diameter that is two times a diameter of a fastening gear part to increase an angle of rotation of the fastening gear part relative to an angle of rotation of an auxiliary handle, thereby allowing a door to be easily opened.

The present invention is also directed to providing a safety door handle for toddlers in which a lock part that is able to be fastened to and unfastened from a gear of a central gear part is included on one side of a cover main body to prevent a door from being randomly opened by a toddler, thereby preventing an accident.

In order to achieve the above objectives, the present invention provides a safety door handle for toddlers, the safety door handle including: a base part that has a base plate in which a lever hole into which a door handle is able to be fitted is formed and that is attached to one surface of a door; a fastening gear part that is coupled to a door handle shaft and has a gear provided on an outer circumferential surface; a central gear part that is gear-coupled to one side of the fastening gear part and has a diameter that is two times a diameter of the fastening gear part; and a main gear part that has the same diameter as the central gear part, is gear-coupled to one side of the central gear part, and has an auxiliary handle provided on one surface.

In an embodiment of the present invention, the base part may further include: a central gear hole through which the central gear part is fastened to one side of the lever hole; a main gear hole through which the main gear part is fastened to one side of the central gear hole; and fastening grooves formed at both sides of the base plate to correspond to portions between the central gear hole and the main gear hole.

In an embodiment of the present invention, the fastening gear part may further include: a main body part that has an inner circumferential surface accommodating the door handle shaft and consists of a one-side main body and an other-side main body by being cut in half through a center of a circle; a fastening part that forms a fastening hole in a cut end surface of the one-side main body and includes a fastening protrusion, which is fitted and coupled to the fastening hole, on a cut end surface of the other-side main body; a mounting wall that extends along a radius of the other-side main body and surrounds the door handle shaft;

and a lever accommodating part that extends from the mounting wall toward the door handle and is able to accommodate a central portion of the door handle.

In an embodiment of the present invention, the central gear part may further include: a central body that is coupled to the central gear hole; and a central plate gear that is axially coupled to the central body and has a gear provided along a circumference.

In an embodiment of the present invention, the main gear part may further include: a main body that is coupled to the main gear hole; and a main plate gear that is axially coupled to the main body and has a gear provided along a circumference.

In an embodiment of the present invention, when the auxiliary handle is pulled and the main plate gear rotates in one direction, the main gear part may allow the central plate gear to rotate in the opposite direction from the main plate gear and may allow the fastening gear part to rotate in the same direction as the main plate gear.

In an embodiment of the present invention, the main gear part may allow the door handle to rotate at an angle that is two times an angle of rotation of the auxiliary handle when the auxiliary handle rotates in the one direction.

In an embodiment of the present invention, the safety door handle may further include a cover part coupled to one surface of the base part, and the cover part may include: a cover main body that has a space corresponding to sizes of the central gear part and the main gear part; fitting protrusions that protrude from an inner side surface of the cover main body and are coupled to the fastening grooves; and a cover ring part that is fastened to an opening, which is formed in one longitudinal side of the cover main body, due to an elastic force allowing the opening to widen and covers the fastening gear part.

In an embodiment of the present invention, the safety door handle may further include a lock part that is disposed on one side of the cover main body and controls rotation of the central gear part, and the lock part may include: a communication hole that passes through the one side of the cover main body to correspond to a position of the central gear part; a stick pin that has one side inserted into the communication hole and is fastened to the gear of the central gear part; and a head that is formed on the other end of the stick pin and linearly moves the stick pin back and forth.

BRIEF DESCRIPTION OF THE DRAWINGS

The above and other objects, features, and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
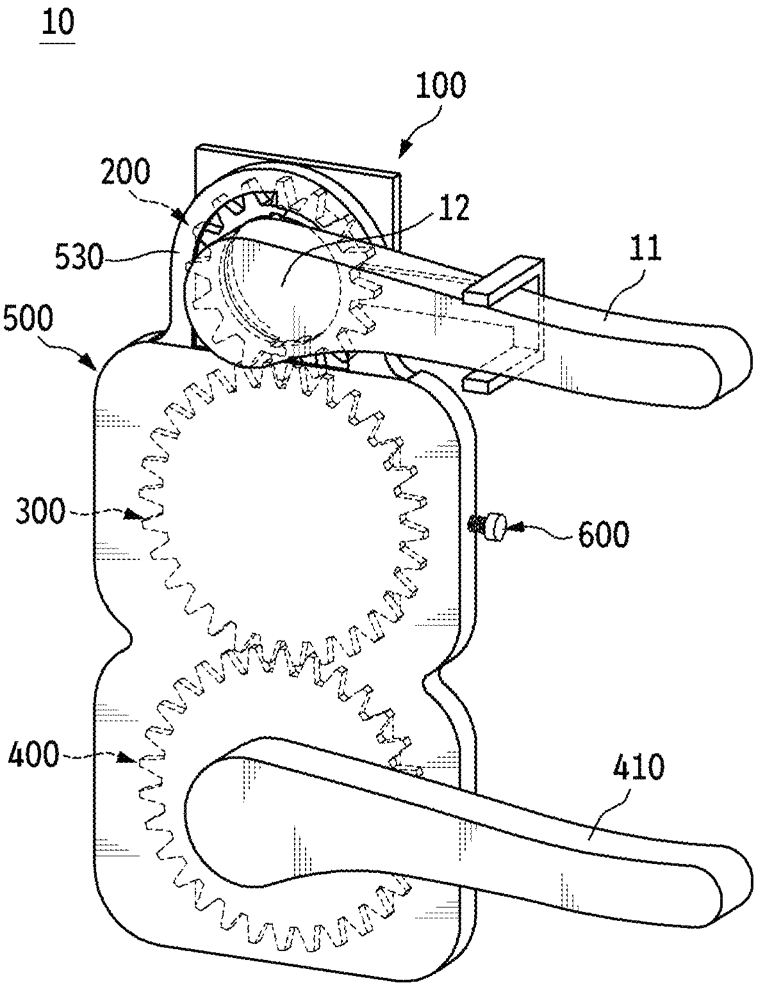
FIG. 1 is a perspective view schematically illustrating the arrangement of a safety door handle for toddlers according to an embodiment of the present invention.

Hereinafter, exemplary embodiments of the present invention will be described in detail with reference to the accompanying drawings to allow those of ordinary skill in the art to which the present invention pertains to easily carry out the present invention. However, in describing operation principles related to the exemplary embodiments of the present invention, when detailed description of a relevant known function or configuration is determined as having the possibility of unnecessarily obscuring the gist of the present invention, the detailed description thereof will be omitted.

In addition, the same reference numerals will be used for parts with similar functions and actions throughout the drawings.

In addition, throughout the specification, when a certain part is described as being "connected" to another part, this includes not only a case in which the part is directly connected to the other part, but also a case in which the part is indirectly connected to the other part with another component disposed therebetween. In addition, unless particularly stated otherwise, "including" a certain component means that another component may be further included instead of excluding other components.

Hereinafter, a safety door handle for toddlers according to an exemplary embodiment of the present invention will be described in detail with reference to the accompanying drawings.

Figure 2:
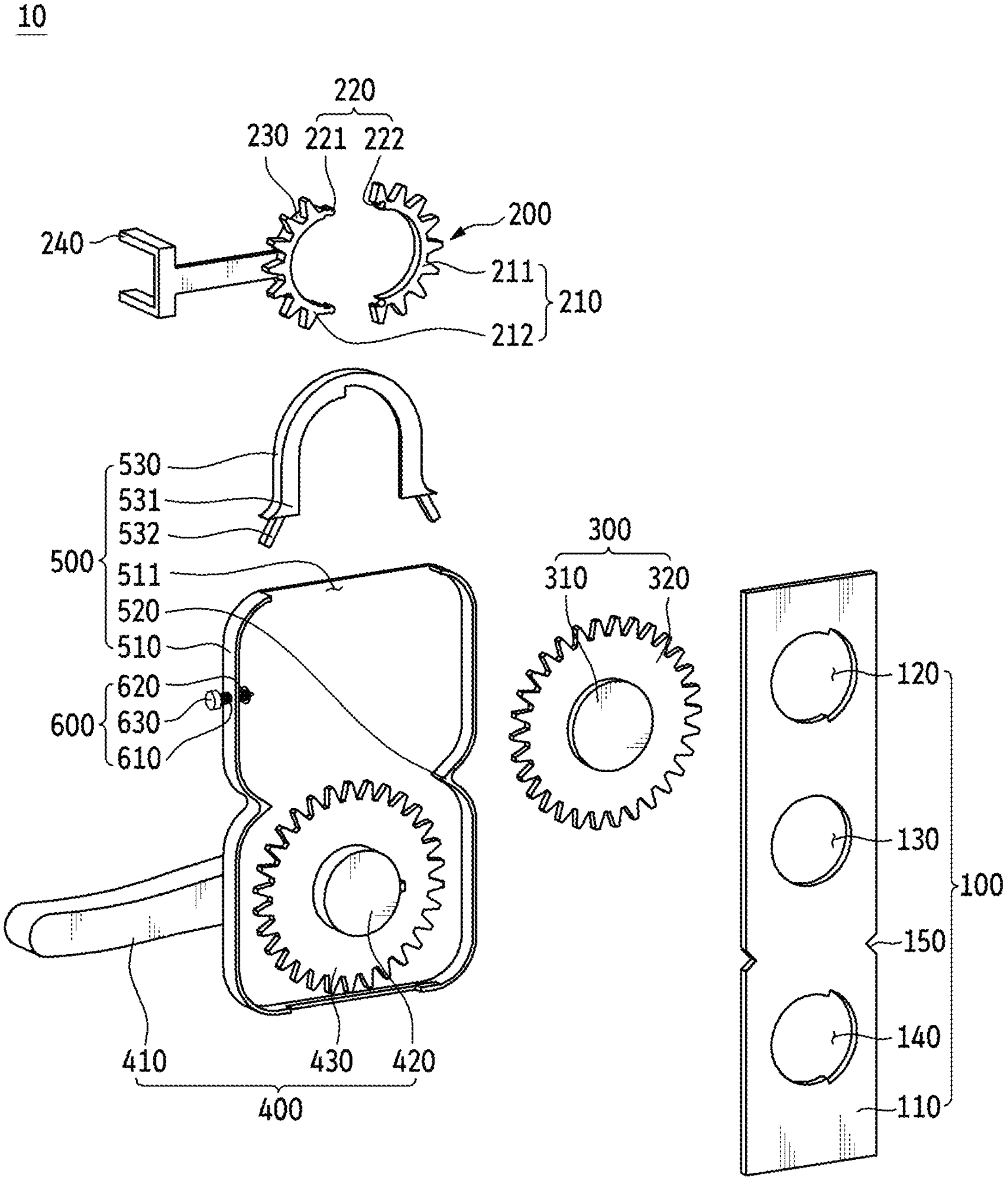
FIG. 2 is an exploded perspective view of FIG. 1.
Figure 3:
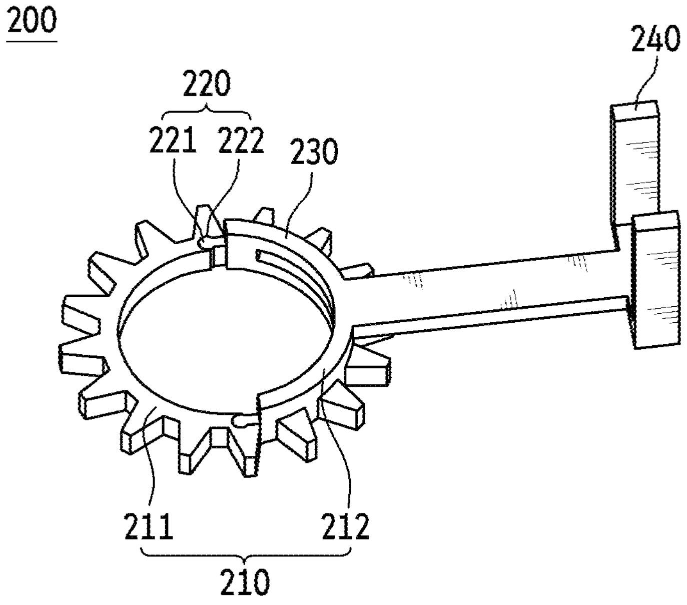
FIG. 3 is a perspective view illustrating a fastening gear part of FIG. 1.
Figure 4:
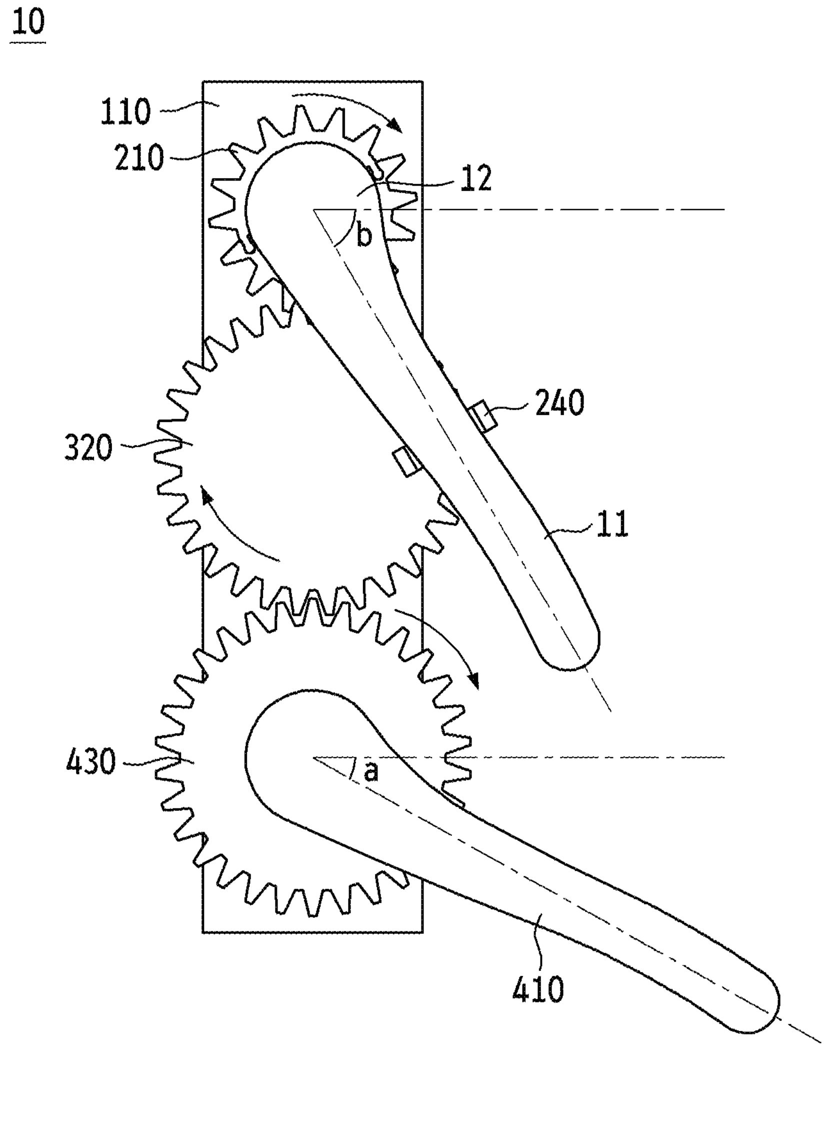
FIG. 4 is an exemplary front view illustrating an operating state of the safety door handle for toddlers according to an embodiment of the present invention.
Figure 5:
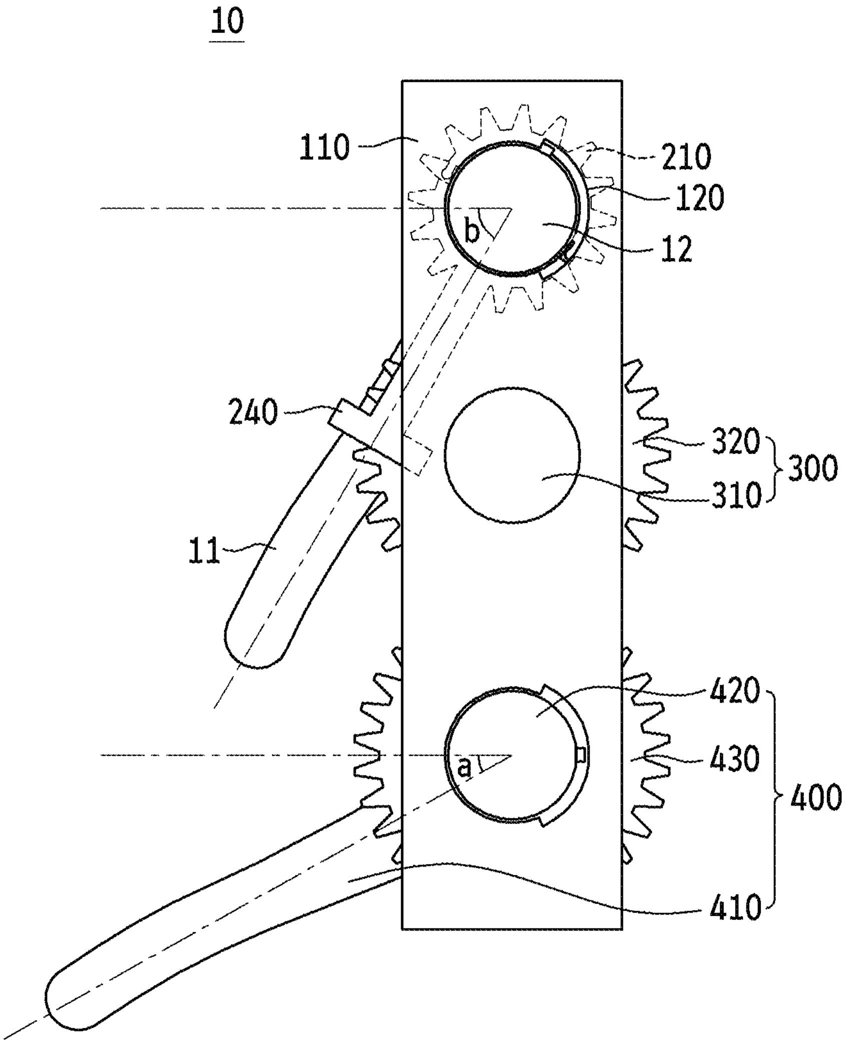
FIG. 5 is an exemplary rear view of FIG. 4.
Figure 6:
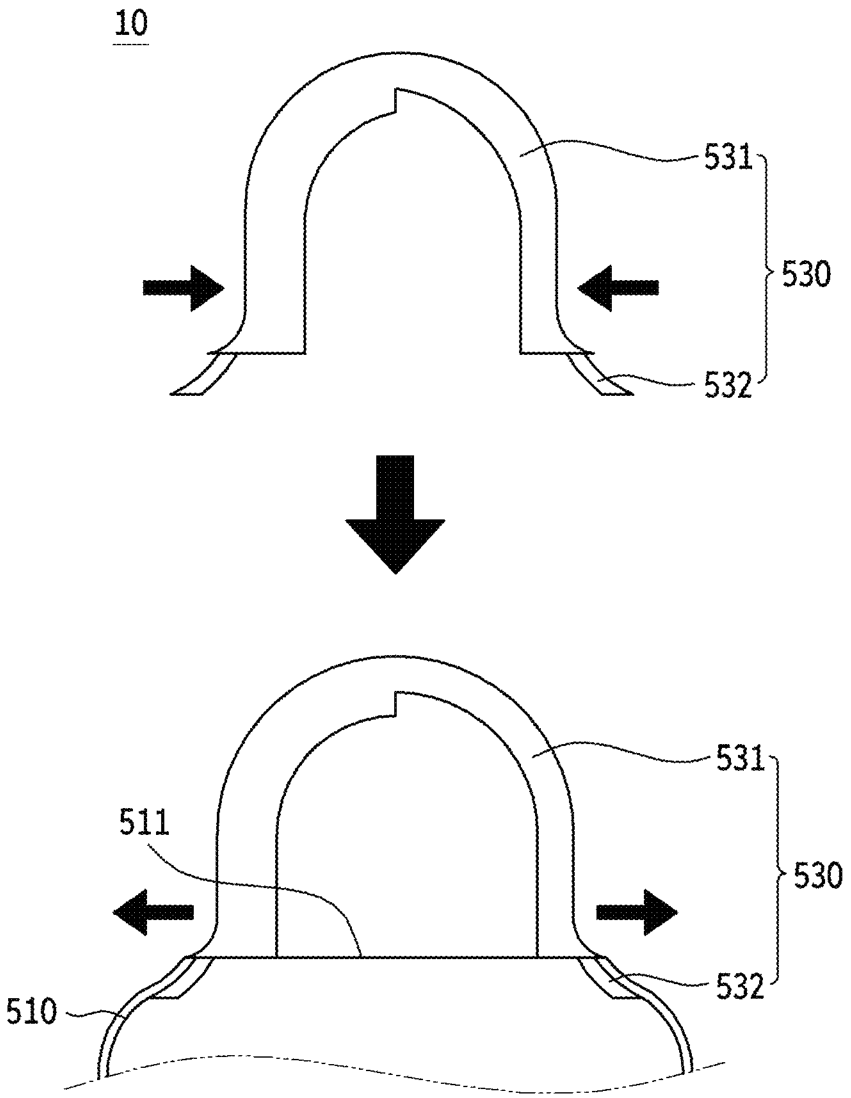
FIG. 6 is an exemplary view illustrating a state of coupling a cover ring part to a cover main body in the safety door handle for toddlers according to an embodiment of the present invention.
Figure 7:
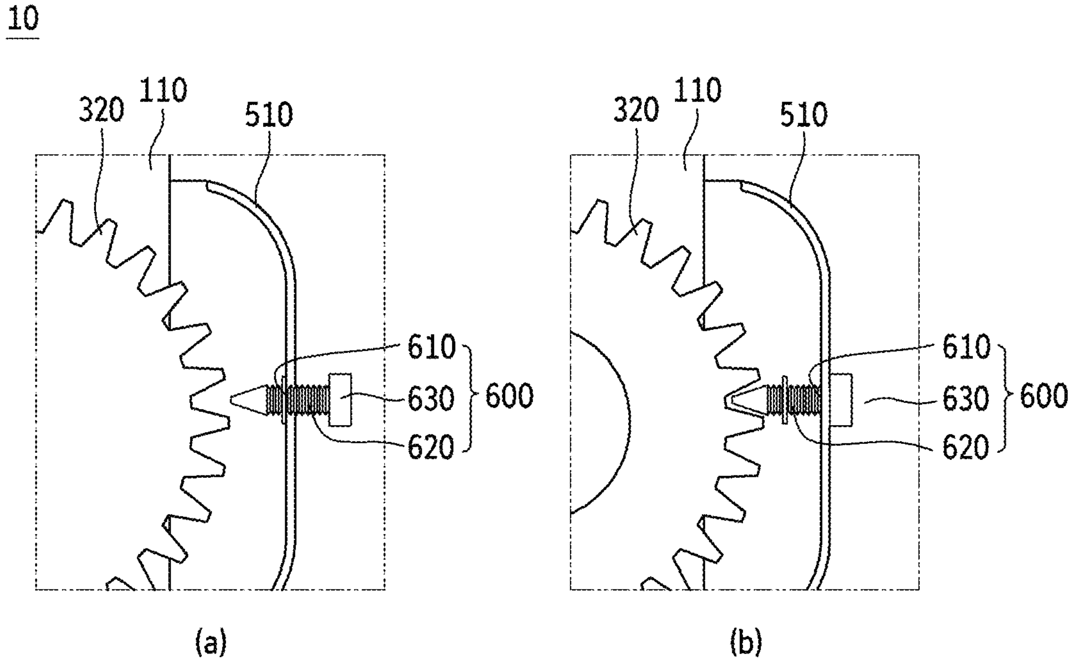
FIG. 7 is an exemplary view illustrating a lock part of the safety door handle for toddlers according to an embodiment of the present invention.

FIG. 1 is a perspective view schematically illustrating the arrangement of a safety door handle for toddlers according to an embodiment of the present invention, FIG. 2 is an exploded perspective view of FIG. 1, FIG. 3 is a perspective view illustrating a fastening gear part of FIG. 1, FIG. 4 is an exemplary front view illustrating an operating state of the safety door handle for toddlers according to an embodiment of the present invention, FIG. 5 is an exemplary rear view of FIG. 4, FIG. 6 is an exemplary view illustrating a state of coupling a cover ring part to a cover main body in the safety door handle for toddlers according to an embodiment of the present invention, and FIG. 7 is an exemplary view illustrating a lock part of the safety door handle for toddlers according to an embodiment of the present invention.

As illustrated in FIG. 1, a safety door handle 10 for toddlers according to an embodiment of the present invention includes a base part 100, a fastening gear part 200, a central gear part 300, and a main gear part 400.

More specifically, as illustrated in FIGS. 1 and 2, the safety door handle 10 for toddlers according to an embodiment of the present invention includes the base part 100 that has a base plate 110 in which a lever hole 120 into which a door handle 11 is able to be fitted is formed and that is attached to one surface of a door, the fastening gear part 200 that is coupled to a door handle shaft 12 and has a gear provided on an outer circumferential surface, the central gear part 300 that is gear-coupled to one side of the fastening gear part and has a diameter that is two times a diameter of the fastening gear part, and the main gear part 400 that has the same diameter as the central gear part, is gear-coupled to one side of the central gear part, and has an auxiliary handle 410 provided on one surface.

Referring to FIG. 2, the base plate 110 that is flat and attached to the one surface of the door while adjacent to a lower portion of the door handle 11 and the lever hole 120 that allows the door handle shaft 12 to be fitted into one longitudinal side of the base plate 110 are formed in the base part 100.

The base plate 110 has a flat rectangular shape and has a plurality of holes, which pass through one surface thereof, arranged in the longitudinal direction to constitute a gear structure which will be described below. In addition, an adhesive is applied or a double-sided tape is attached to the other surface of the base plate 110 for the base plate 110 to be attached to the one surface of the door.

In addition, the base plate 110 is formed to have a width that is narrower than the diameter of each of the central gear part 300 and the main gear part 400. This is to allow extra space to be secured by as much as a thickness of the base plate 110 for fingers to be placed at both sides of the width of the base plate 110 when a central body 310 and a main body 420 are held by a human hand and coupled to the base plate 110. In addition, this is to reduce manufacturing costs.

The lever hole 120 serves to allow the base plate 110 to be placed on the door handle shaft 12 through the door handle 11.

Referring to FIGS. 2 and 5, the base part 100 further includes a central gear hole 130, a main gear hole 140, and fastening grooves 150.

The central gear hole 130 is a hole through which the central gear part 300 is fastened to one side of the lever hole 120.

The main gear hole 140 is a hole through which the main gear part 400 is fastened to one side of the central gear hole 130.

The fastening grooves 150 are grooves formed at both sides of the base plate 110 to correspond to portions between the central gear hole 130 and the main gear hole 140.

That is, the fastening grooves 150 are coupled to and accommodate fitting protrusions 520 of a cover part 500 which will be described below, and allow a cover main body 510 to be placed on the one surface of the base plate 110. In addition, the fastening grooves 150 allow the cover main body 510 to cover the central gear part 300 and the main gear part 400.

As illustrated in FIGS. 2 and 3, the fastening gear part 200 is coupled to and surrounds the door handle shaft 12 and allows the door handle shaft 12 to rotate in response to rotation of the central gear part 300.

To this end, the fastening gear part 200 further includes a main body part 210, a fastening part 220, a mounting wall 230, and a lever accommodating part 240.

The main body part 210 has an inner circumferential surface accommodating the door handle shaft 12 and consists of a one-side main body 211 and an other-side main body 212 by being cut in half through a center of a circle. In addition, a toothed gear is formed on an outer circumferential surface of the main body part 210, and the main body part 210 can be gear-coupled to the central gear part 300.

The fastening part 220 forms a fastening hole 221 in a cut end surface of the one-side main body 211 and includes a fastening protrusion 222, which is fitted and coupled to the fastening hole 221, on a cut end surface of the other-side main body 212.

For example, in a state in which the one-side main body 211 and the other-side main body 212 are separated, the one-side main body 211 is placed on an outer circumferential surface of the door handle shaft 12 first, and the other-side main body 212 is placed in a direction facing the one-side main body 211. In addition, the fastening protrusion 222 of the other-side main body 212 is pushed into and forcibly fitted and coupled to the fastening hole 221.

Referring to FIG. 3, the mounting wall 230 is a wall body that extends along a radius of the other-side main body 212 and surrounds the door handle shaft 12.

For example, the present invention uses a method in which the door handle shaft 12 is rotated by the main body part 210 that rotates in response to the rotation of the central gear part 300. At this time, the mounting wall 230 is provided to prevent idling of the main body part 210 about the door handle shaft 12 that may occur due to a low frictional force between the main body part 210 and the door handle shaft 12. That is, the mounting wall 230 comes into close contact with the door handle shaft 12 and forms a frictional force, thereby allowing a rotational force of the central gear part 300 to be transmitted to the door handle shaft 12.

Referring to FIGS. 3 and 4, the lever accommodating part 240 is a holder that extends from the mounting wall 230 toward the door handle 11 and is able to accommodate a central portion of the door handle 11.

For example, the lever accommodating part 240 has a support body that extends in one direction from the mounting wall 230 and a square-bracket-shaped holder that is disposed at an end of the support body and accommodates the door handle 11. As a result, a rotational force applied to the main body part 210 corresponding to the rotation of the central gear part 300 is transmitted to the lever accommodating part 240 through the mounting wall 230. Accordingly, a frictional force of the mounting wall 230 and a frictional force of the lever accommodating part 240 increase a rotational force of the main body part 210 and allow the door handle shaft 12 to rotate.

Referring to FIGS. 2 and 4, the central gear part 300 is gear-coupled to one side of the fastening gear part 200 and has a diameter that is two times a diameter of the fastening gear part 200.

To this end, the central gear part 300 further includes the central body 310 and a central plate gear 320.

The central body 310 is formed as a flat cylinder or a disk having height that is coupled to the central gear hole 130.

The central plate gear 320 is axially coupled to the central body 310, has a gear provided along a circumference, rotates in response to rotation of a main plate gear 430, and transmits a rotational force to the main body part 210 of the fastening gear part 200.

In addition, the central plate gear 320 has a circumference that is two times a circumference of the main body part 210, and with a small angle of rotation, allows the main body part 210 to rotate with a large angle of rotation.

Referring to FIGS. 2 and 4, the main gear part 400 has the same diameter as the central gear part 300, is gear-coupled to one side of the central gear part 300, and has the auxiliary handle 410 provided on one surface. In addition, the main gear part 400 further includes the main body 420 and the main plate gear 430.

The auxiliary handle 410 is provided on one surface of the main plate gear 430 and is preferably disposed at a position that may be reached by a hand of a toddler.

For example, toddlers and children who are short are usually not able to open a door while holding a handle of the door, and thus lift an arm, move their body weight toward the door, and pull the door handle 11. When the door is opened in a state in which the body weight is moved toward the door, the center of gravity moves in a direction in which the door is opened, and an accident may occur due to a toddler or a child falling down or his or her face getting hit by the door.

In order to address such problems, based on the vertical direction, the main plate gear 430 is placed on a lowermost portion of the base part 100 of the present invention, and the auxiliary handle 410 is provided on the main plate gear 430.

The main body 420 is coupled to the main gear hole 140 and is the same as the central body 310.

The main plate gear 430 is axially coupled to the main body 420 and has a gear provided along a circumference.

Referring to FIGS. 4 and 5, when the auxiliary handle 410 is pulled and the main plate gear 430 rotates in one direction, the main gear part 400 causes the central plate gear 320 to rotate in the opposite direction from the main plate gear 430 and causes the fastening gear part 200 to rotate in the same direction as the main plate gear 430.

In addition, when the auxiliary handle 410 is rotated in one direction, the main gear part 400 causes the door handle 11 to rotate at an angle that is two times an angle of rotation of the auxiliary handle 410.

For example, a case in which a toddler or a child pulls the auxiliary handle 410 to open the door will be described.

As illustrated in FIGS. 4 and 5, the auxiliary handle 410 is rotated at an angle ranging from −25° to −30° about the X-axis. Due to the auxiliary handle 410, the main plate gear 430 rotates in one direction, and in conjunction with the main plate gear 430, the central plate gear 320 rotates in the opposite direction. The main body part 210 gear-coupled to the central plate gear 320 rotates in the same direction as the main plate gear 430, which is the opposite direction from the central plate gear 320.

Next, the mounting wall 230 and the lever accommodating part 240 move along the circumference in the same direction as the direction of rotation of the main body part 210 and allow the door handle 11 to move along the circumference. Due to the movement of the door handle 11, the door handle shaft 12 rotates, and the door can be opened.

In particular, since the central plate gear 320 and the main plate gear 430 each have a circumference that is two times a circumference of the main body part 210, an angle of rotation of the main body part 210 can be made two times an angle of rotation of the auxiliary handle 410. As a result, even when an angle at which a toddler or a child pulls the auxiliary handle 410 is small, since the angle of rotation of the main body part 210 is large, the door can be opened.

As illustrated in FIGS. 2 and 6, the safety door handle 10 for toddlers according to an embodiment of the present invention may include the cover part 500.

The cover part 500 is coupled to one surface of the base part 100 and may include the cover main body 510, the fitting protrusions 520, and a cover ring part 530.

The cover main body 510 has a space corresponding to sizes of the central gear part 300 and the main gear part 400. It is preferable to include the cover main body 510 in order to prevent gears of the central gear part 300 and the main gear part 400 from being damaged due to foreign matter or external impact. In addition, the cover main body 510 is for preventing an accident in which a finger of a toddler gets caught in the central gear part 300 and the main gear part 400 that are exposed.

The fitting protrusions 520 are protrusions protruding from an inner side surface of the cover main body 510. The fitting protrusions 520 are coupled to the fastening grooves 150 and allow the cover main body 510 to be firmly placed on one surface of the base part 100.

Referring to FIGS. 1 and 6, the cover ring part 530 is fastened to an opening 511, which is formed in one longitudinal side of the cover main body 510, due to an elastic force allowing the opening 511 to widen and serves to cover the fastening gear part 200.

To this end, the cover ring part 530 includes a fastening gear cover 531 and ring protrusions 532.

The fastening gear cover 531 has a U-shape having one side where a circumference having a width accommodating a gear of the main body part 210 is formed and the other side that is open toward the opening 511 and extends. A reason for separating the fastening gear cover 531 from the cover main body 510 is to separately replace only the main body part 210 because the fastening gear part 200 is coupled to the door handle shaft 12 after separating the main body part 210. That is, this is to allow the main body part 210 to be separated from and coupled to the door handle 11 by separating only the fastening gear cover 531 without separating the cover main body 510 from the base plate 110.

The ring protrusions 532 protrude as a pair from respective ends of the other side of the fastening gear cover 531.

For example, in a process of coupling the cover ring part 530 to the cover main body 510, when the other side of the fastening gear cover 531 is pressed toward the center, a distance between the ends of the other side decreases, and the pair of ring protrusions 532 come closer to each other. The ring protrusions 532 are inserted into the opening 511 to release the force pressing the other side of the fastening gear cover 531. As a repulsive force acts due to elasticity of the other side of the fastening gear cover 531, the distance between the ends of the other side of the fastening gear cover 531 increases, and the ring protrusions 532 are mounted on the opening 511.

As illustrated in FIGS. 2 and 7, the safety door handle 10 for toddlers according to an embodiment of the present invention may include a lock part 600.

The lock part 600 is disposed on one side of the cover main body 510 and serves to control rotation of the central gear part 300. To this end, the lock part 600 includes a communication hole 610, a stick pin 620, and a head 630.

The communication hole 610 is a hole that passes through the one side of the cover main body 510 to correspond to the position of the central gear part 300.

The stick pin 620 has one side inserted into the communication hole 610 and is fastened to the gear of the central gear part 300. In addition, the one side may be made sharp and may be accommodated in the central plate gear 320. At this time, the stick pin 620 is adjacent to the head 630 and includes a flange 621, which is wider than a circumference of the communication hole 610, formed on an outer circumferential surface, and in this way, the stick pin 620 is prevented from falling out of the communication hole 610.

The head 630 is formed on the other end of the stick pin 620 and serves to linearly move the stick pin 620 back and forth.

In an operating process of the lock part 600, the head 630 is pressed toward the central plate gear 320 of the central gear part 300. Due to the force pressing the head 630, the stick pin 620 moves and is accommodated in and coupled to the central plate gear 320.

At this time, when the auxiliary handle 410 is pulled, the main plate gear 430 and the main body part 210, which interlock with the central plate gear 320, stop rotating due to the central plate gear 320, and the door cannot be opened.

In addition, the door can be opened by pulling the head 630, causing the stick pin 620 to move to its original position from the central plate gear 320, and pulling the auxiliary handle 410.

A safety door handle for toddlers according to the present invention has an advantage that the occurrence of minor malfunctions can be prevented by transmitting a rotational force to a door handle shaft using a gear structure in which a main gear part, a central gear part, and a fastening gear part are rotated with a force pulling an auxiliary handle.

In addition, since a fastening gear part, which can be cut into semicircular portions that can be separated and coupled, can be easily coupled to a door handle shaft, there is an advantage that even an unskilled person can install the fastening gear part.

In addition, since a central gear part and a main gear part are each formed to have a diameter that is two times a diameter of a fastening gear part to increase an angle of rotation of the fastening gear part relative to an angle of rotation of an auxiliary handle, there is an advantage that a door can be opened by a toddler slightly pulling the auxiliary handle.

In addition, there are advantages that a risk of introduction of foreign matter into or damage to a central gear part and a main gear part can be prevented with a structure in which a cover main body is attached to and detached from a base part, and when a failure occurs in the central gear part and the main gear part, a desired component can be replaced by separating the cover main body from the base part.

Further, since a lock part that can be fastened to and unfastened from a gear of a central gear part is included on one side of a cover main body, a door can be prevented from being randomly opened by a toddler, and the occurrence of accidents can be prevented.

Exemplary embodiments of the present invention have been described above in the detailed description of the present invention, but the embodiments are only for describing the most favorable embodiments of the present invention and are not intended to limit the present invention. In addition, anyone of ordinary skill in the art to which the present invention pertains can make various modifications and imitations within the scope not departing from the scope of the technical spirit of the present invention.

Therefore, the scope of the present invention is not limited to the embodiments described above, and may be implemented with embodiments of various forms within the appended claims. In addition, various modifications that may be made by anyone of ordinary skill in the art to which the present invention pertains are also construed as falling within the scope of the claims of the present invention.

What is claimed is:

1. A safety door handle for toddlers, the safety door handle comprising:

a base part that has a base plate in which a lever hole into which a door handle is able to be fitted is formed and that is attached to one surface of a door;

a fastening gear part that is coupled to a door handle shaft and has a gear provided on an outer circumferential surface;

a central gear part that is gear-coupled to one side of the fastening gear part and has a diameter that is two times a diameter of the fastening gear part; and a main gear part that has the same diameter as the central gear part, is gear-coupled to one side of the central gear part, and has an auxiliary handle provided on one surface.

2. The safety door handle of claim 1, wherein the base part further includes:

a central gear hole through which the central gear part is fastened to one side of the lever hole;

a main gear hole through which the main gear part is fastened to one side of the central gear hole; and fastening grooves formed at both sides of the base plate to correspond to portions between the central gear hole and the main gear hole.

3. The safety door handle of claim 2, wherein the central gear part further includes:

a central body that is coupled to the central gear hole; and a central plate gear that is axially coupled to the central body and has a gear provided along a circumference.

4. The safety door handle of claim 3, wherein the main gear part further includes:

a main body that is coupled to the main gear hole; and a main plate gear that is axially coupled to the main body and has a gear provided along a circumference.

5. The safety door handle of claim 4, wherein, when the auxiliary handle is pulled and the main plate gear rotates in one direction, the main gear part allows the central plate gear to rotate in the opposite direction from the main plate gear and allows the fastening gear part to rotate in the same direction as the main plate gear.

6. The safety door handle of claim 5, wherein the main gear part allows the door handle to rotate at an angle that is two times an angle of rotation of the auxiliary handle when the auxiliary handle rotates in the one direction.

7. The safety door handle of claim 2, further comprising a cover part coupled to one surface of the base part, wherein the cover part includes:

a cover main body that has a space corresponding to sizes of the central gear part and the main gear part;

fitting protrusions that protrude from an inner side surface of the cover main body and are coupled to the fastening grooves; and a cover ring part that is fastened to an opening, which is formed in one longitudinal side of the cover main body, due to an elastic force allowing the opening to widen and covers the fastening gear part.

8. The safety door handle of claim 7, further comprising a lock part that is disposed on one side of the cover main body and controls rotation of the central gear part, wherein the lock part includes:

a communication hole that passes through the one side of the cover main body to correspond to a position of the central gear part;

a stick pin that has one side inserted into the communication hole and is fastened to a gear of the central gear part; and a head that is formed on the other end of the stick pin and linearly moves the stick pin back and forth.

9. The safety door handle of claim 1, wherein the fastening gear part further includes:

a main body part that has an inner circumferential surface accommodating the door handle shaft and consists of a one-side main body and an other-side main body by being cut in half through a center of a circle;

a fastening part that forms a fastening hole in a cut end surface of the one-side main body and includes a fastening protrusion, which is fitted and coupled to the fastening hole, on a cut end surface of the other-side main body;

a mounting wall that extends along a radius of the other-side main body and surrounds the door handle shaft; and a lever accommodating part that extends from the mounting wall toward the door handle and is able to accommodate a central portion of the door handle.

* * * * *